United States Patent
Bacon et al.

(10) Patent No.: US 7,298,846 B2
(45) Date of Patent: Nov. 20, 2007

(54) METHOD OF IDENTIFYING MULTIPLE DIGITAL STREAMS WITHIN A MULTIPLEXED SIGNAL

(75) Inventors: Kinney Bacon, Lawrenceville, GA (US); Maynard Hammond, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 807 days.

(21) Appl. No.: 09/729,523

(22) Filed: Dec. 4, 2000

(65) Prior Publication Data

US 2002/0101991 A1    Aug. 1, 2002

Related U.S. Application Data

(60) Provisional application No. 60/170,344, filed on Dec. 13, 1999.

(51) Int. Cl.
*H04N 7/167* (2006.01)
(52) U.S. Cl. .............. 380/212; 380/200; 380/210; 380/240; 713/193
(58) Field of Classification Search ........ 713/193; 380/212, 33, 201; 348/563, 565; 714/746; 370/375; 725/81
See application file for complete search history.

(56) References Cited

U.S. PATENT DOCUMENTS

| | | | |
|---|---|---|---|
| 5,381,476 A * | 1/1995 | Kimoto et al. .............. 380/201 |
| 5,420,866 A * | 5/1995 | Wasilewski ................. 370/426 |
| 5,425,101 A | 6/1995 | Woo et al. |
| 5,430,494 A * | 7/1995 | Saeger et al. ............... 348/565 |
| 5,485,221 A * | 1/1996 | Banker et al. .............. 348/563 |
| 5,506,904 A * | 4/1996 | Sheldrick et al. ........... 380/212 |
| 5,708,961 A * | 1/1998 | Hylton et al. ................ 725/81 |
| 5,838,873 A | 11/1998 | Blatter et al. |
| 5,903,314 A | 5/1999 | Niijima et al. .............. 348/564 |
| 5,905,713 A * | 5/1999 | Anderson et al. ........... 370/241 |
| 5,936,660 A | 8/1999 | Gurantz |
| 6,026,506 A * | 2/2000 | Anderson et al. ........... 714/746 |
| 6,035,037 A * | 3/2000 | Chaney ....................... 380/227 |
| 6,038,319 A * | 3/2000 | Chari ........................... 380/33 |
| 6,137,795 A * | 10/2000 | Tominaga et al. .......... 370/375 |
| 6,985,188 B1 * | 1/2006 | Hurst, Jr. .................... 348/553 |

FOREIGN PATENT DOCUMENTS

| | | |
|---|---|---|
| EP | 0 893 921 | 1/1999 |
| WO | WO 99/57889 | 11/1999 |

* cited by examiner

*Primary Examiner*—Gilberto Barrón, Jr.
*Assistant Examiner*—Arezoo Sherkat

(57) ABSTRACT

In a subscriber television system with a host terminal, the present invention allows the identification of the individual packets from two separate MPEG transport streams that have been multiplexed together for decoding by a single external conditional access or point-of-deployment (POD) module. The decoding of individual packets from two separate MPEG transport streams supports the use of multiple tuner host terminals for such functions as picture-in-picture (PIP) program viewing and the viewing of one program while recording a second program.

21 Claims, 5 Drawing Sheets

METHOD OF IDENTIFYING MULTIPLE DIGITAL STREAMS WITHIN A MULTIPLEXED SIGNAL

CROSS-REFERENCE TO RELATED APPLICATIONS

The present application claims priority to U.S. Provisional Patent Application No. 60/170,344, Bacon et al., entitled Method of Supplying Multiple Digital Streams to an External Conditional Access Module, filed Dec. 13, 1999, which is incorporated herein by reference.

FIELD OF THE INVENTION

This invention relates generally to decrypting multiple digital data streams in a subscriber television system, and more specifically to supplying multiple digital streams to an external conditional access or Point-of-Deployment (POD) module for decryption.

BACKGROUND OF THE INVENTION

Historically, a subscriber television system operator provides a subscriber with a set-top terminal that allows the subscriber to receive and decrypt television programs and services. The set-top provides access to the subscriber television system, including providing conditional access for the specific subscriber television system. The subscriber television system uses conditional access to prevent unauthorized users from pirating or accessing the system services. A system subscriber "rented" the set-top from the subscriber television system by paying a monthly fee. Subscriber's returned the set-top when they moved or changed service providers.

The Telecommunications Act of 1996, which is being implemented by the Federal Communications Commission (FCC), allows subscribers to buy a host terminal, also known as a consumer set-top terminal, from a variety of sources for use in any subscriber television system. The host terminal may be integrated into a videocassette recorder (VCR), television (TV), computer, or other similar device.

The operator of each subscriber television system has the responsibility of providing an interface for this subscriber owned equipment that allows it to function with the individual subscriber television system. To address the concern of the subscriber television system operators about conditional access and piracy, the FCC directed the Society of Cable Television Engineers (SCTE) to establish standards for what is referred to as an external conditional access module or a Point-of-Deployment (POD) module. The POD module provides a removable conditional access element for a host terminal. A POD module is provided by the individual subscriber television system and upon insertion into a host terminal, and upon receiving proper authorization, allows the decryption of encrypted conditional access services to prevent piracy. A POD module conforms generally to the Personal Computer Memory Card International Association (PCMCIA) standards. The POD module is typically a little larger than a credit card, is inserted into a slot in a host terminal, and communicates with the host terminal via a PCMCIA connector. The POD module would be removed from the host terminal and returned to the subscriber television system when the subscriber moves or changes service providers. The subscriber would get a new POD module from the next subscriber television system to which they elect to subscribe for services.

The subscriber television systems provide a large quantity of programs and services. The programs and services are typically provided to the subscriber via transport streams within a transmission signal. There can be multiple programs or services within a single transport stream and multiple transports streams within the transmission signal. A host terminal that wants to simultaneously display programming from two separate transport streams would use two tuners, one for each transport stream. This creates a problem in that there is the possibility that two transport streams need to be decrypted for conditional access. The SCTE specification limits the number of data streams that can be input at one time into a POD module to one. On a host terminal with Picture-in-Picture (PIP) functionality that requires two inputs, the host terminal would not be able to simultaneously decrypt the two data streams to provide both the main and the secondary picture data. A host terminal with multiple data streams, such as those with two or more tuners, must limit the decryption to one data stream from one tuner. The system subscriber that owns a host terminal with multiple tuners will want to use the functionality that is provided with those elements, such as PIP or the simultaneous taping and viewing of different programs. The operator of a subscriber television system needs to be able to provide a POD module that is capable of receiving multiple data streams for decryption to support the multiple tuner functionality. Thus, what is needed is a method, host terminal, and external conditional access module that allows the decryption of multiple data streams to support a multiple data stream host terminal.

DETAILED DESCRIPTION

Figure 1:
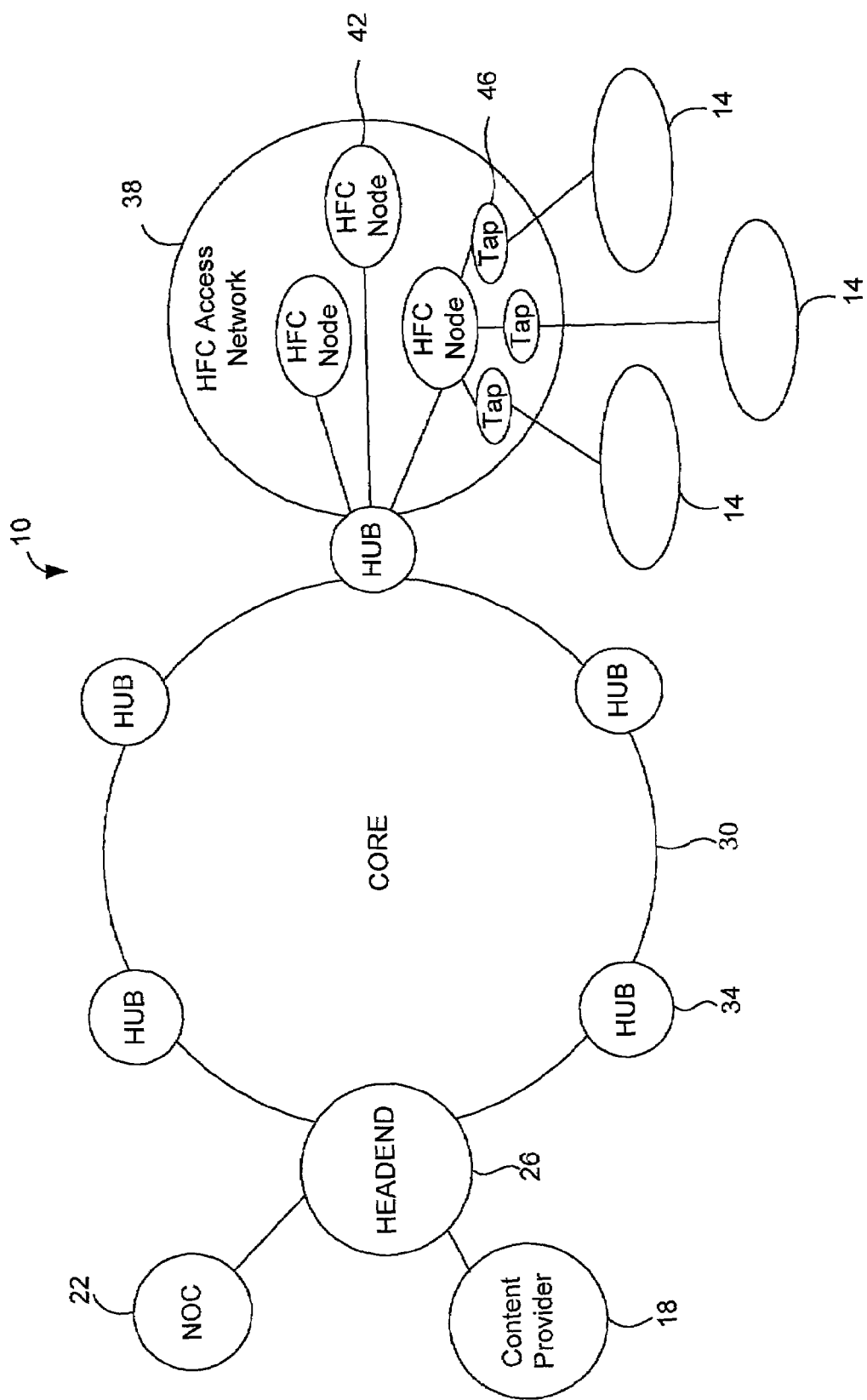
FIG. 1 is a block diagram of a subscriber television system.

The present invention is directed to a method, host terminal, and external conditional access module that enable the decryption of portions of multiple packetized data streams associated with a multiple tuner host terminal.

The available functionality can vary widely between different host terminals, based on several factors. The available functionality may vary based on cost and manufacturer of the host terminal or based on the support provided by the local subscriber television system. A less expensive host terminal would typically have less functionality. The host terminal may include the equipment need to perform a function, but if an individual subscriber television system does not allow or support a function the subscriber may not be able to access the function. For example, a host terminal may have multiple tuners to support picture-in-picture (PIP) video display, but if the subscriber television system does not allow or support PIP, a subscriber may not be able to use the functionality available in their host terminal. Conditional access is one method a system operator can use to control the functionality available within an individual subscriber television system. With conditional access, a subscriber needs authorization to access some or all of the programs or services. An external conditional access module or point-of-deployment (POD) module controls the conditional access of the subscriber to the programming and services of the subscriber television system. The system operator provides the external conditional access module that a subscriber inserts into their host terminal. The host terminal would normally transmit data packets for a subscriber-selected program to the external conditional access module for decryption. The host terminal would also typically transmit a data clock or start signal that indicates the start of each of the data packets. The external conditional access module determines if the subscriber is authorized to receive a selected program and, if authorized, decrypts the data packets for that program. The decrypted data packets can then be decoded and displayed to the subscriber.

The advent of picture-in-picture capabilities and the desire to be able to record one program while viewing another requires the ability to perform conditional access on packets from multiple packetized data streams without adding a second external conditional access module. Multiple data streams provide data for two or more programs to be displayed simultaneously. The present invention allows the identification, by a single POD module, of the individual packets from two or more separate MPEG transport streams that have been multiplexed together for decrypting. The POD module, knowing the source of the individual packet, can determine if the packet is authorized to be decrypted for the individual subscriber and the correct decryption parameters to apply to decrypt each packet.

The present invention will be described more fully hereinafter with reference to the accompanying drawings in which like numerals represent like elements throughout the several figures and in which exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The present invention is best understood within the context of a subscriber television system. Referring now to the drawings, a subscriber television system and exemplary embodiments of the present invention will be described.

FIG. 1 shows a block diagram view of a subscriber television system 10, including a Host Terminal 14. Generally, the subscriber television system 10 is a high quality, reliable and integrated network system that features video, audio, voice, and data services to subscribers. Although FIG. 1 depicts a high level view of a subscriber television system including a regional Hybrid Fiber/Coax (HFC) Access Network 38, as will be described below, it should be appreciated that a plurality of subscriber television systems can tie together a plurality of regional networks into an integrated global network so that subscribers can receive content provided from anywhere in the world. The subscriber television system 10 shown in FIG. 1 delivers broadcast video signals as digitally formatted signals in addition to delivering traditional broadcast analog video signals. Furthermore, the system can support one way broadcast services as well as both one-way data services and two-way media and data services. The two-way operation of the network allows for subscriber interactivity with services, such as Pay-Per-View programming, View-on-Demand programs, and interactive applications, such as Email, Internet connections, and EPG applications.

The subscriber television system 10 provides the interfaces, network control, transport control, session control, and servers to access content and services, and distributes content and services to subscribers. As shown in FIG. 1, a typical subscriber television system 10 is composed of interfaces to Content Providers 18, Network Operations Centers (NOC) 22, core networks 30 of headends 26, hubs 34, HFC Access Networks 38, and subscribers' host terminals 14. It should be appreciated that although single components (e.g., headend 26, core network 30, HFC Access network 38, etc.) are illustrated in FIG. 1, a subscriber television system 10 can feature a plurality of each of the illustrated components.

The Content Provider 18 represents one or more providers of content, such as video channels, music channels, data channels, video services, audio services, and data services. For example, the Content Provider 18 could comprise an Electronic Program Guide (EPG) data provider that acts as a data service provider. The Content Provider 18 could also represent an Internet Service Provider (ISP) providing data to the system to enable subscribers' web access or web-enhanced video via the subscriber's television set. The Content Provider 18 transmits the content to a headend 26 for further transmission to subscribers downstream in the network. Also in communication with the headend 26 is a Network Operation Center (NOC) 22, which is an external management center, interfaced with the subscriber television system 10 to allow for the remote operation of the system.

Content provided by the Content Provider 18 is communicated to one or more headends 26. From those headends 26 the content is then communicated to the core network 30 of hubs 34 and onto a plurality of HFC Access Networks (only one HFC Access Network 38 is illustrated). The HFC Access Network 38 typically comprises a plurality of HFC nodes 42, each of which may service a local geographical area. The content provided from the Content Provider 18 is transmitted through the headend 26, hub 34 and HFC Access Network 38 downstream to one or more taps 46 from each one of the HFC nodes 42 of the HFC Access Network 38. The hub 34 connects to the HFC node 42 through the fiber portion of the HFC Access Network 38. Usually, the HFC node 42 connects to a subscriber's host terminal 14 through coaxial cable in a logical tree configuration, which is where the optical-to-electrical and electrical-to-optical conversations of the HFC network take place. From the HFC node 42 a coaxial drop connects the tap 46 to a subscribers' home.

Figure 2:
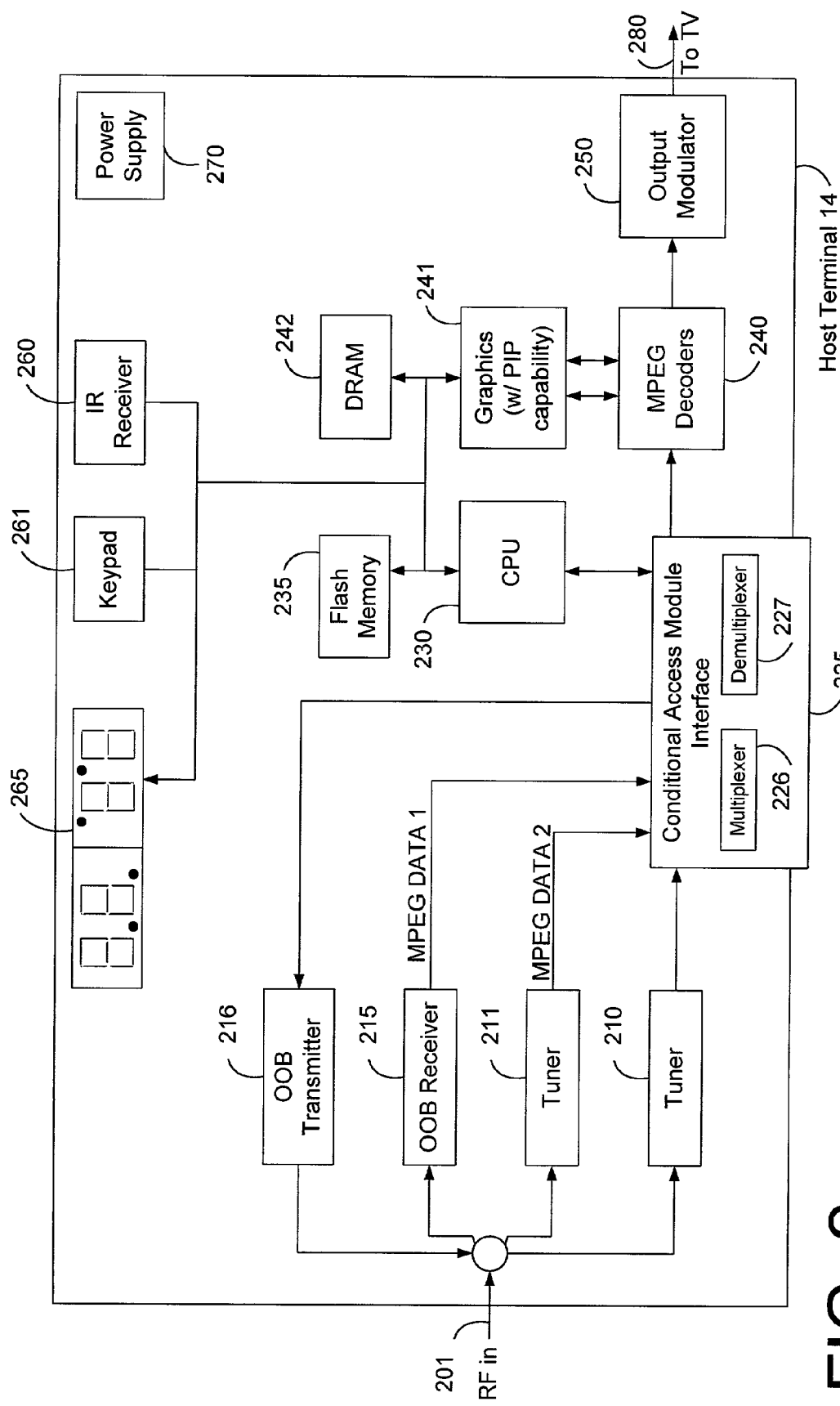
FIG. 2 is a block diagram of a host terminal.

FIG. 2 is a block diagram view of a host terminal 14. The host terminal 14 receives the incoming radio frequency (RF) signal 210 from the subscriber television system 10. The signal is available to the multiple tuners 210 and 211 and to the out-of-band (OOB) receiver 215 and transmitter 216. The OOB signaling provides an alternative communications path within the subscriber television system 10. Control, signaling, and return communications are typically communicated using the OOB terminal 14 and the POD interface 225. The host terminal 14 contains all the normal circuitry required to function as a set-top terminal (STT) or home communications terminal (HCT) including a power supply 270, an LED display 265, an infrared (IR) receiver 260, a keypad 261, an output modulator 250, an MPEG decoder 240, a graphics generator 241, a DRAM 242, a Flash 235, and other support circuitry. This host terminal 14 also includes two independent tuners, tuner 210 and tuner 211, and is capable of receiving and tuning two separate, encrypted packetized data streams. The present invention assigns a unique designator or address to each tuner to be used in identifying the source of packetized data. Additionally, the host terminal 14 contains the circuitry required to interface to a POD module, which uses the POD interface 225 and a PCMCIA PC Card connector. The typical POD 225 interface specification is described in the Society of Cable Telecommunications Engineers, Inc., Engineering Committee, Digital Video Subcommittee Document SCTE DVS/295, entitled "*Proposed HOST-POD Interface Specification*", dated Jan. 7, 2000, which is incorporated herein by reference. The POD interface 225 of the present invention includes additional or modified elements to support decrypting packetized data from multiple sources. A multiplexer 226 and a demultiplexer 227 are included. The multiplexer 226 multiplexes together select portions of the separate signals it receives from each tuner and generates a unique designator signal indicating the originating tuner for each portion of the multiplexed signal. The demultiplexer 227 takes the returned signal from a POD module and separates it into demultiplexed signals associated with each tuner.

Figure 3:
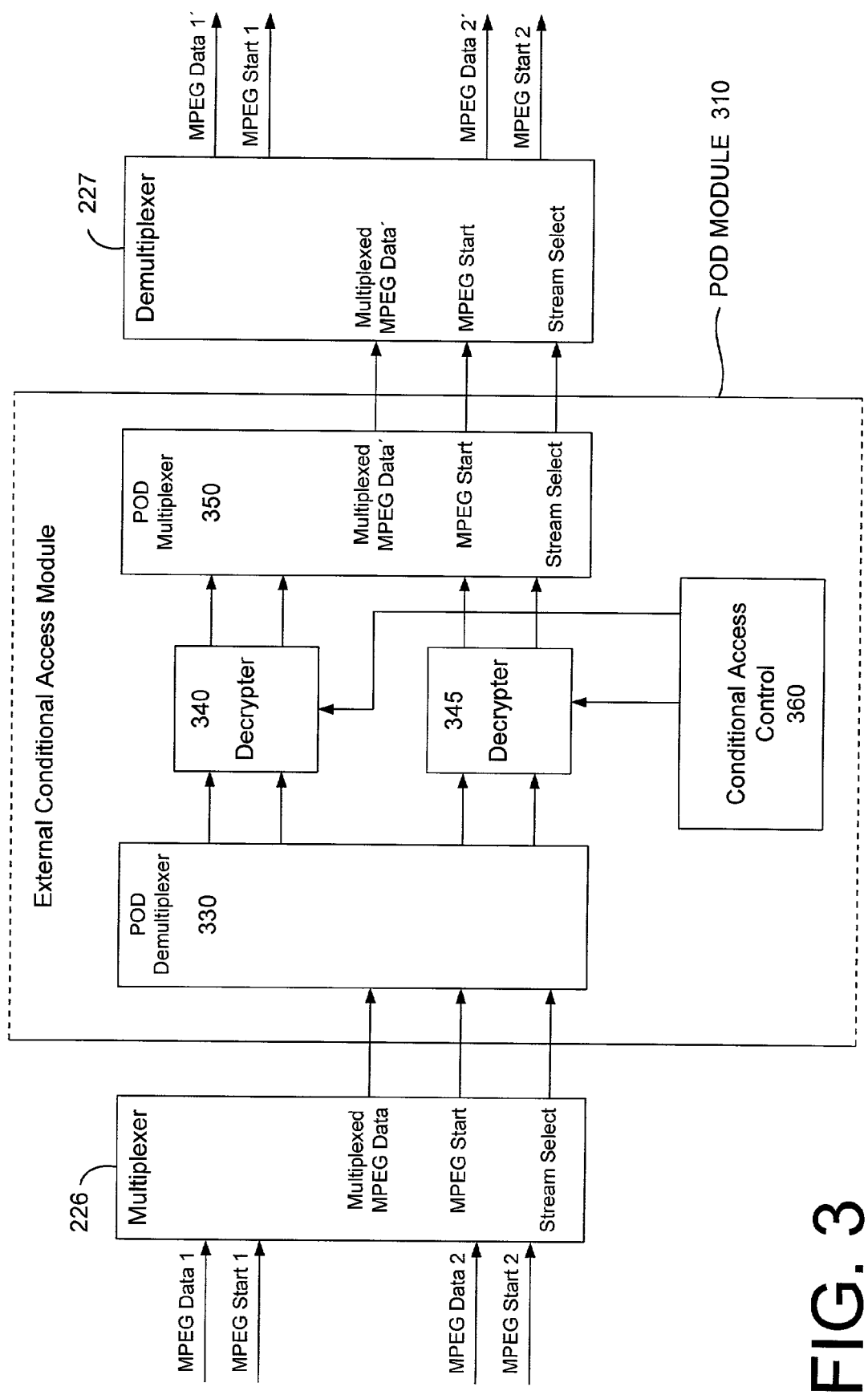
FIG. 3 is a block diagram view of the functional components of an external conditional access module.

FIG. 3 is a block diagram view of the functional components of an external conditional access module 310. The external conditional access module or point-of-deployment (POD) module 310 is inserted into the subscriber's host terminal 14. The specifications of the POD module 310 are described in the Society of Cable Telecommunications Engineers, Inc., Engineering Committee, Digital Video Subcommittee Document SCTE DVS 131, Rev. 7, entitled "*Draft Point-of-Deployment (POD) Module Interface Proposal*", dated Dec. 3, 1998, which is incorporated herein by reference. The POD module 310 interfaces to the POD interface 225 of FIG. 2, including the multiplexer 226 and the demultiplexer 227.

In an exemplary embodiment the data stream is a Moving Picture Experts Group (MPEG) transport stream. The present invention is not so limited and can be used to identify multiplexed portions of other types of data streams, including identifying the source of different portions of a multiplexed signal associated with two separate data bit streams or with packetized data streams. The packetized data streams can include formatted data such as Internet Protocol (IP), MPEG-4, and asynchronous transfer mode (ATM) formatted data. In this exemplary embodiment, MPEG refers to the MPEG-1 and MPEG-2 standards. The MPEG-1 standards (ISO/IEC 11172) and the MPEG-2 standards (SO/IEC 13818) are described in detail in the International Organization for Standardization document ISO/IEC JTC1/SC29/WG11 N (June 1996 for MPEG-1 and July 1996 for MPEG-2), which are hereby incorporated by reference.

The multiplexer 226, of host terminal 14, takes MPEG Data 1 and MPEG Data 2 from their respective sources and multiplexes the two data streams together to create the Multiplexed MPEG Data. The multiplexer 226 transmits the multiplex of multiple complete transport streams to the POD module 310. The MPEG Data 1 and MPEG Data 2 can be a variety of data and data formats, including a bit stream, a packetized data stream, IP data, and individual MPEG transport streams with audio, video, and data packets. The multiplexing can be performed based on a variety of data unit sizes, including data unit sizes of a bit, a byte, or a packet.

An MPEG transport stream can contain data packets for multiple programs. In an alternative embodiment, the multiplexer 226 determines the packet identification (PID) for the packets related to a selected program within the transport streams from each source and then multiplexes together the desired program associated packets based on the associated PIDs. In this alternative embodiment, only the desired packets are transmitted to the POD module 310.

Figure 4:
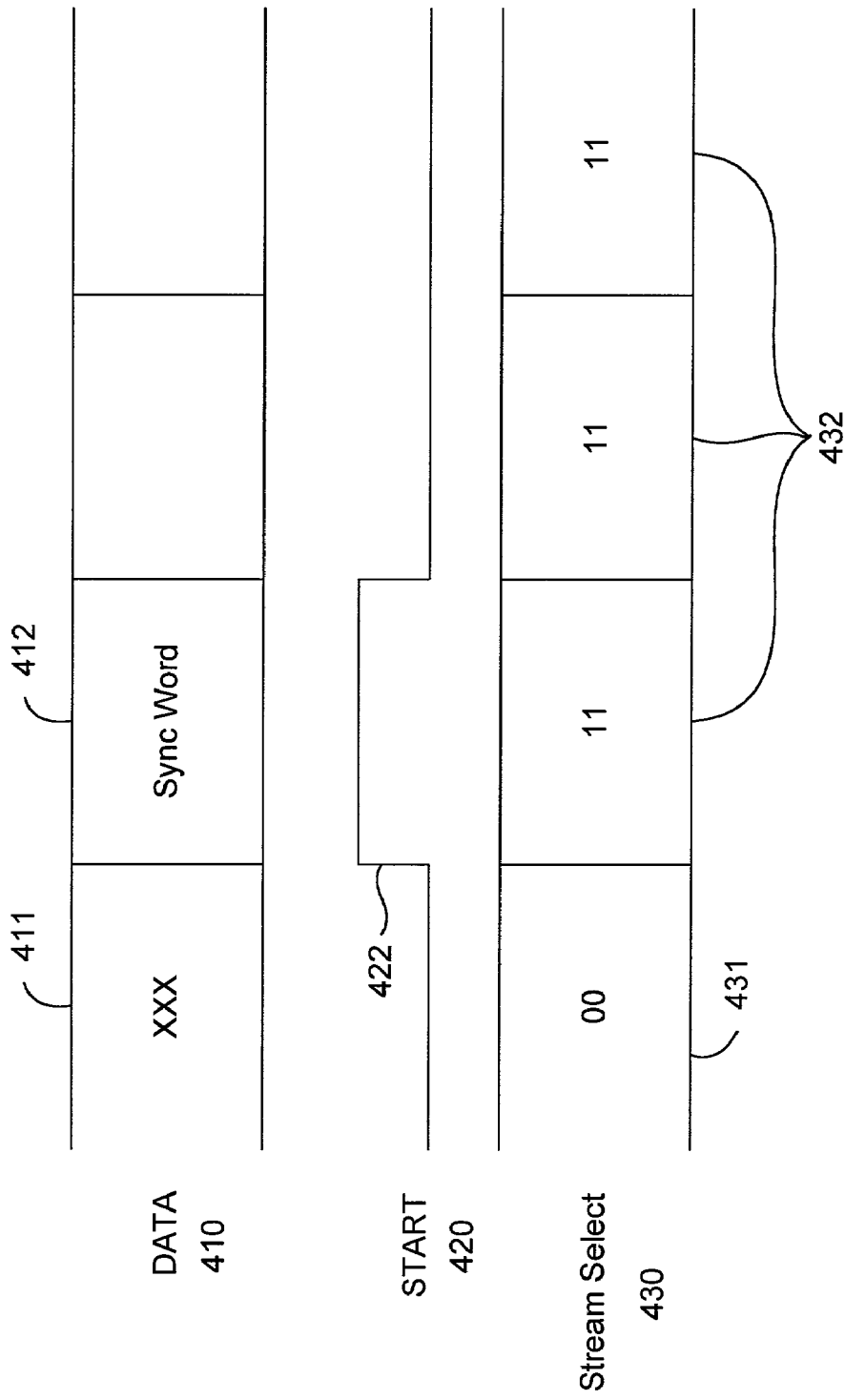
FIG. 4 is an illustration of a packetized data signal with a start of packet signal and a transport stream source indicator signal.

Referring to FIG. 4, the Data or Multiplexed MPEG Data stream signal 410 is the multiplex of the MPEG Data 1 and MPEG Data 2 data streams. The Start or MPEG Start signal 420 indicates the start of an MPEG packet with a signal level change 422 and is associated with the synchronization (sync) word 412 in the header of an MPEG packet. In an alternative embodiment, the Start signal 420 indicates a bit or byte of data. The Stream Select or transport stream source indicator signal 430 indicates the source of the associated portion of the signal, portions including bits, bytes, or packets. For example, the packets starting with the packet containing sync word 412 are associated with the MPEG Data 1 source assigned the unique designator "11" 432 and the prior packet 411 would be associated with the MPEG Data 2 source assigned the unique designator "00" 431. In addition to the Multiplexed MPEG Data stream signal 410, the multiplexer 226 transmits the MPEG Start signal 420 and the Stream Select signal 430 signal to the POD module 310. The MPEG Start signal 420 is associated with the MPEG clocks signals of the MPEG Data 1 and MPEG Data 2 data streams.

Referring again to FIG. 3, the POD module 310 receives the Data stream signal 410, the MPEG Clock signal 420, and a Stream Select signal 430 in the POD Demultiplexer 330. The demultiplexer 330 identifies the portions of the Data stream signal 410 as packets from each unique source (MPEG Data 1 or MPEG Data 2) based on the Stream Select signal 430. The source-associated packets of the Data stream signal 410 are transmitted to a source-associated decryptor, either decryptor 340 or decryptor 345, for decryption. The Conditional Access Control 360 determines if the subscriber is authorized to have the source-associated data decrypted. If the subscriber is authorized to receive the selected program or service, the Conditional Access Control 360 instructs decryptor 340 or decryptor 345 as to the proper decryption to use for decrypting the selected program associated data. This means that data associated with both, either, or neither source may be decrypted. If the decision is made to authorize decryption, the authorized source associated data will pass through a decryptor, otherwise the decryptor is bypassed. The selected program packets from decryptor 340 and decryptor 345 are transmitted to POD Multiplexer 350 to be recombined into a Multiplexed MPEG Data' signal. The packets may be decrypted if the subscriber was authorized to receive the packet associated program or service. The data can still be encrypted if the subscriber was not authorized to receive the associated programming or service. The Multiplexed MPEG Data' signal, with the recombined data of the source associated packets, is transmitted back to the demultiplexer 227 of the host terminal 14. The demultiplexer 227 uses the Stream Select signal 430 to separate the Multiplexed MPEG Data' signal back into post-decryption tuner associated signals MPEG Data 1' and MPEG Data 2', with associated MPEG Start signals. The MPEG Data 1' and MPEG Data 2' signals are related to the initial MPEG Data 1 and MPEG Data 2 signals. The host terminal 14 uses the decrypted signals to cause the display of programming associated with a fist tuner, the MPEG Data 1' signal, as a primary picture and the programming associated with a second tuner, the MPEG Data 2' signal, as a secondary picture for a PIP function. Those skilled in the art will appreciate that the order of the PIP pictures can be reversed and that the separately identified signaling can be used for other purposes such as recording one program while continuing to view another program.

Figure 5:
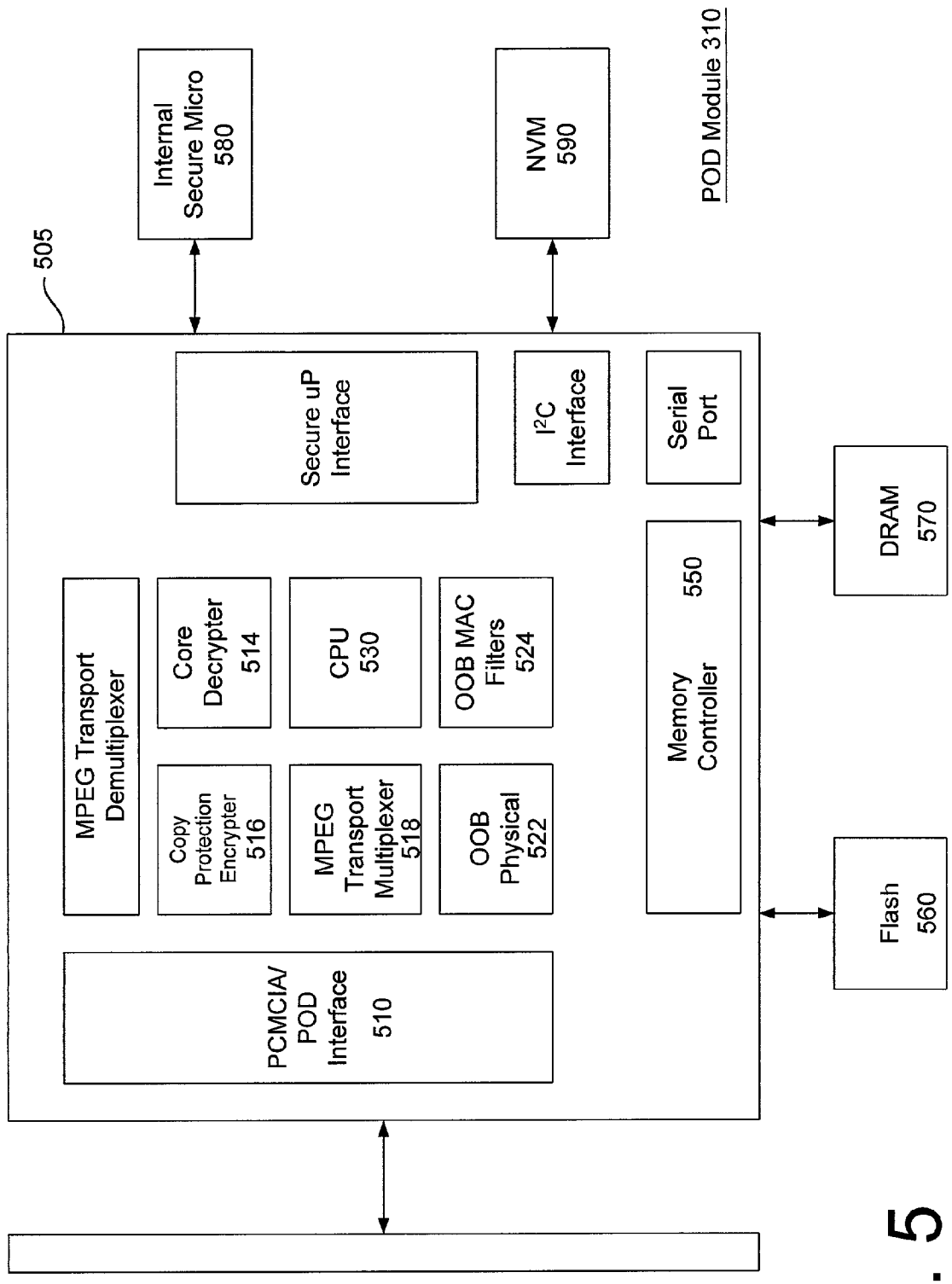
FIG. 5 is a detailed block diagram view of the functional components of an external conditional access module.

FIG. 5 is a detailed functional block diagram of the POD module 310 of the present invention. In another exemplary embodiment, the POD module 310 contains a PCMCIA connection 505 through which MPEG transport streams are received by PCMCIA/POD interface 510, demultiplexed by MPEG Transport Demultiplexor 512, decrypted if the conditional access control allows by Core Decryptor 514, re-encrypted for copy protection by Encryptor 516, multiplexed back together by MPEG Transport Multiplexor 518, and transmitted to the host terminal 14 by PCMCIA/POD interface 510. Additionally, the POD module 310 contains circuitry, OOB Physical 522 and OOB MAC Filters 524, for receiving of Out-of-Band (OOB) signals in the MPEG transport stream. The OOB signaling is used for transmitting Entitlement Management Messages (EMM) that determine if conditional access to selected programming and services is granted or allowed. The Central Processing Unit (CPU) 530 controls and monitors the functions of the POD module 310 and accesses Flash memory 560 and Dynamic Random Access Memory (DRAM) 570 through the Memory Controller 550. A Secure Microprocessor 580 is utilized to receive and control the EMM as well as the Entitlement Control Message (ECM). The ECM is used to verify the EMMs. The EMMs and ECM together provide the information required to determine if the subscriber is entitled to access the digital video/audio stream and for the POD module 310 to perform the decryption. A Non-Volatile Memory (NVM) 590 is used to store non-secure system parameters.

The outputs of the two tuners, tuner 210 and tuner 211, in the host terminal 14 are two separate independent signals. The independent signals are passed through multiplexor 226 in the host terminal 14 that synchronizes them and combines them into a single data stream 410 that is sent through the modified POD interface 510 using the MPEG input stream select signal 430 to indicate the source of the active or current packetized data. The multi-stream capable POD module 310 demultiplexes these signals and uses the conditional access circuitry (internal secure microprocessor 580) to independently determine if the POD module 310 is authorized to decrypt the packetized data from each stream. This means that packetized data from both, either, or neither stream may be decrypted. If the decision is made to authorize decryption, the authorized packetized data will pass through a decryptor, otherwise the decryptor is bypassed. In one embodiment, if the packetized data was decrypted, that data will be re-encrypted to provide copy protection between the POD module 310 and the host terminal 14. The two packetized data streams will then be multiplexed back together and transmitted to the host terminal 14. The host terminal 14 demultiplexes the streams and performs the desired user function such as picture-in-picture or taping one video/audio stream while viewing another.

One advantage of the present invention is the minimnization of the number of connections required between the host terminal 14 and the POD module 310 for processing multiple packetized data streams. Utilizing the same input and output signals prevents the interface from requiring a larger connection. The POD module 310 uses 68-connector pins in the interface. There are 6 unused signals (A13-A10, A3-A2) in a standard POD module configuration. Other methods could require an additional 18 signals and a total of 12 extra connector pins to add a single additional digital video/audio stream. With the present invention, only two extra signals are required for the multiplex selection or Stream Select signal 430. No extra connector pins are required. In an embodiment using the 6 unused POD module 310 signals (3 for input, 3 for output), portions of up to 8 packetized data streams can be multiplexed together.

An exemplary embodiment of the present invention modifies the standard POD interface to change the A12 signal to the input stream select signal and the A13 signal to the output stream select signal'. The POD module 310 initializes in a PCMCIA mode compatible with the PCMCIA standards. After initialization the POD module 310 functions in an external conditional access mode. The pin assignments of the PCMCIA/POD interface 510 between the host terminal 14 and the POD module 310 of an exemplary embodiment of the present invention are as follows:

TABLE 1

PCMCIA/POD pin assignments

| PCMCIA Pin Signal Name | I/O | POD Signal Name | I/O | Comments |
| --- | --- | --- | --- | --- |
| 1 Ground | Power | Ground | Power | Ground |
| 2 Data 3 | I/O | Data 3 | I/O | Data bit 3 |
| 3 Data 4 | I/O | Data 4 | I/O | Data bit 4 |
| 4 Data 5 | I/O | Data 5 | I/O | Data bit 5 |
| 5 Data 6 | I/O | Data 6 | I/O | Data bit 6 |
| 6 Data 7 | I/O | Data 7 | I/O | Data bit 7 |
| 7 CE1# | I | CE1# | I | Card enable 1 |
| 8 Address 10 | I | Address 10 | I | Address bit 10 |
| 9 OE# | I | OE# | I | Card output enable |
| 10 Address 11 | I | Address 11 | I | Address bit 11 |
| 11 Address 9 | I | DRX | I | Receiver data |
| 12 Address 8 | I | CRX | I | Receiver gapped clock |
| 13 Address 13 | I | MOSS | I/O | MPEG Output Stream Select |
| 14 Address 14 | I | MCLKO | O | MPEG clock output |
| 15 WE# | I | WE# | I | Write enable |
| 16 READY/IREQ# | O | IREQ# | O | Interrupt request |
| 17 Vcc | Power | Vcc | Power | 3.3V |
| 18 Vpp1 | Power | Vpp1 | Power | 5V-Switched |
| 19 Address 16 | I | MIVAL | I | MPEG input valid |
| 20 Address 15 | I | MCLKI | I | MPEG input clock |
| 21 Address 12 | I | MISS | I | MPEG Input Stream Select |
| 22 Address 7 | I | QTX | O | Transmitter Q channel |
| 23 Address 6 | I | ETX | O | Transmitter enable |
| 24 Address 5 | I | ITX | O | Transmitter I channel |
| 25 Address 4 | I | CTX | I | Transmitter gapped clock |

TABLE 1-continued

PCMCIA/POD pin assignments

| PCMCIA Pin Signal Name | I/O | POD Signal Name | I/O | Comments |
|---|---|---|---|---|
| 26 Address 3 | I | Address 3 | I | Address bit 3 |
| 27 Address 2 | I | Address 2 | I | Address bit 2 |
| 28 Address 1 | I | Address 1 | I | Address bit 1 |
| 29 Address 0 | I | Address 0 | I | Address bit 0 |
| 30 Data 0 | I/O | Data 0 | I/O | Data bit 0 |
| 31 Data 1 | I/O | Data 1 | I/O | Data bit 1 |
| 32 Data 2 | I/O | Data 2 | I/O | Data bit 2 |
| 33 WP/IOIS16 # | O | IOIS19# | O | 16 bit I/O (always high) |
| 34 Ground | Power | Ground | Power | Ground |
| 35 Ground | Power | Ground | Power | Ground |
| 36 CD1# | O | CD1# | O | Card detect 1 |
| 37 Data 11 | I/O | MDO3 | O | MPEG data out bit 3 |
| 38 Data 12 | I/O | MDO4 | O | MPEG data out bit 4 |
| 39 Data 13 | I/O | MDO5 | O | MPEG data out bit 5 |
| 40 Data 14 | I/O | MDO6 | O | MPEG data out bit 6 |
| 41 Data 15 | I/O | MDO7 | O | MPEG data out bit 7 |
| 42 CE2# | I | CE2# | I | Card enable 2 |
| 43 VS1#/Refresh | O | VS1 | 0 | Voltage sense 1 |
| 44 IORD# | I | IORD# | I | I/O Read |
| 45 IOWR# | I | I0WR# | I | I/O Write |
| 46 Address 17 | I | MISTRT | I | MPEG input start |
| 47 Address 18 | I | MDI0 | I | MPEG data in bit 0 |
| 48 Address 19 | I | MDI1 | I | MPEG data in bit 1 |
| 49 Address 20 | I | MDI2 | I | MPEG data in bit 2 |
| 50 Address 21 | I | MDI3 | I | MPEG data in bit 3 |
| 51 Vcc | Power | Vcc | Power | 3.3V |
| 52 Vpp2 | Power | Vpp2 | Power | 5V-Switched |
| 53 Address 22 | I | MDI4 | I | MPEG data in bit 4 |
| 54 Address 23 | I | MDI5 | I | MPEG data in bit 5 |
| 55 Address 24 | I | MDI6 | I | MPEG data in bit 6 |
| 56 Address 25 | I | MDI7 | I | MPEG data in bit 7 |
| 57 VS2# | O | VS2# | O | Voltage Sense 2 |
| 58 RESET | I | RESET | I | Card reset |
| 59 WAIT# | O | WAIT# | O | Extend bus cycle |
| 60 INPACK# | O | INPACK# | O | Input port ack |
| 61 REG# | I | REG# | I | Register select |
| 62 BVD2/SPKR# | O | MOVAL | O | MPEG data out valid |
| 63 BVD1/STSCHG# | O | MOSTRT | O | MPEG data out start |
| 64 Data 8 | I/O | MDO0 | O | MPEG data out bit 0 |
| 65 Data 9 | I/O | MDO1 | O | MPEG data out bit 1 |
| 66 Data 10 | I/O | MDO2 | O | MPEG data out bit 2 |
| 67 CD2# | O | CD2# | O | Card detect 2 |
| 68 Ground | Power | Ground | Power | Ground |

Those skilled in the art will recognize that the pin assignments could be changed, adjusted, expanded, or reduced and that alternate implementations are included within the scope of the present invention.

Although the present invention has been described in one embodiment as allowing the decryption of multiple packetized data streams in a POD module 310, those skilled in the art will recognize that the unique designator and the Stream Select signal 430 can be used to allow multi-tasking of multiple packetized data streams by other components, such as the MPEG Decoders 240 of host terminal 14. In one embodiment the host terminal 14 Demultiplexer 227 would not be needed, as a modified MPEG Decoders 240 could interface with the multiplexed data signal 410.

The unique designator is not to be confused with a packet identifier (PID). The PID is associated with the packet and identifies all packets with the same type of data associated with a particular program or service. For example, the video packets associated with the television program for channel 12 will all have the same PID. The unique identifier of the present invention is associated with the source of the portion of the multiplexed signal for the packetized data.

In addition, those skilled in the art will recognize that to provide PIP or multiple recording options for multiple programs within the same transport stream, two or more of the multiple tuners could be tuned to the same transport stream. The present invention separately identifies the packetized data signals based on the tuner or source providing the input, even if the input signals to the tuners is identical.

Those skilled in the art will recognize that the elements herein described in the POD module 310 and the host terminal 14 can be used for multiple functions and in various combinations within the scope of the present invention. For example, the Encryptor 516 can provide encryption for a variety of reasons including for copy protection and to prevent signal piracy between the POD module 310 and the host terminal 14.

The terms encryption and decryption are intended to include encryption and decryption and the scrambling and unscrambling of data, including audio and video signals. Scrambling is the disarrangement of the elements of a transmission in order to make it unintelligible to anyone without an authorized receiver.

It should be emphasized that the above-described embodiments of the present invention are merely possible examples of the implementations, set forth for a clear understanding of the principles of the invention. Many variations and modifications may be made to the above-described embodiments of the invention without departing substantially from the spirit of the principles of the invention. All such modifications and variations are intended to be included herein within the scope of the disclosure and the present invention and protected by the following claims.

What is claimed is:

1. In a system with a plurality of packetized data streams, a method of designating a source of at least one packetized data stream within a multiplexed signal including at least a portion of the at least one packetized data stream, the method comprising the steps of:
    assigning to the source device of the at least one packetized data stream, a first unique designator;
    assigning to the source program of the at least one packetized data stream, a program identification number:
    multiplexing at least the portion of the at least one packetized data stream with at least a portion of a second packetized data stream to create the multiplexed signal; and
    transmitting the first unique designator in conjunction with the multiplexed signal, wherein the first unique designator indicates the source device of the at least one packetized data stream.

2. The method of claim 1, wherein the packetized data stream is in a format compliant with at least one of Moving Picture Experts Group type 2 (MPEG-2) standard, Moving Picture Experts Group type 4 (MPEG-4) standard, Asynchronous Transfer Modulation (ATM) standard, and Internet Protocol (IP) standard.

3. The method of claim 1, wherein the step of transmitting the first unique designator comprises the steps of:
    creating a first unique designator signal that includes the first unique designator; and
    transmitting the first unique designator signal in conjunction with the multiplexed signal, wherein the first unique designator signal provides the first unique designator at the start of the at least one packet of the at least one packetized data stream.

4. The method of claim 1, wherein the step of transmitting the first unique designator comprises the steps of:
    creating a first unique designator signal that includes the first unique designator; and
    transmitting the first unique designator signal in conjunction with the multiplexed signal, wherein the first unique designator signal provides the first unique designator at the start of the at least one byte of the at least one packetized data stream.

5. In a host terminal, a method of multiplexing together packets from at least two packetized data streams to enable decryption of the packets by an external conditional access module, the method comprising the steps of:
    assigning to each of the source devices originating the at least two packetized data streams, associated unique designators;
    assigning to each source program originating the at least two packetized data streams, associated program identification numbers;
    multiplexing the packets forming portions of the at least two packetized data streams into a signal;
    creating an association for each packet in the signal with the unique designator of the originating packetized data stream from which each packet originated;
    transmitting the signal and the associations of the packets to the external conditional access module; and
    decrypting, in the external conditional access module, the packets in the signal based on the associated unique designators.

6. The method of claim 5, wherein the at least two packetized data streams are in a format compliant with at least one of Moving Picture Experts Group type 2 (MPEG-2) standard, Moving Picture Experts Group type 4 (MPEG-4) standard, Asynchronous Transfer Modulation (ATM) standard, and Internet Protocol (IP) standard.

7. In a system with a plurality of Moving Picture Experts Group type 2 (MPEG-2) standard transport streams and a host terminal, a method of designating to an external conditional access module a source of at least one packet of a first MPEG-2 transport stream with a multiplexed signal including the at least one packet of the first MPEG-2 transport stream, the method comprising the steps of:
    assigning to the source device of the first MPEG-2 transport stream, a unique designator;
    assigning to the source program of the first MPEG-2 transport stream, a program identification number:
    creating a transport stream source indicator signal that includes the unique designator associated with the at least one packet of the first MPEG-2 transport stream;
    multiplexing the at least one packet of the first MPEG-2 transport stream with packets from at least a portion of a second MPEG-2 transport stream to create the multiplexed signal; and
    transmitting to the external conditional access module the transport stream source indicator signal in conjunction with the multiplexed signal, wherein transmission of the transport stream source indicator signal, by the unique designator, indicates the source device of the at least one packet as the source device of the first MPEG-2 transport stream.

8. The method of claim 7, further including the step of decrypting, in the external conditional access module, the at least one packet based on the source of the first MPEG-2 transport stream.

9. The method of claim 8, further including the step of transmitting the decrypted at least one packet from the external conditional access module to the host terminal.

10. An external conditional access module comprising:
    a host terminal interface configured to receive from a host terminal, an incoming multiplexed signal comprising at least one packetized data stream that includes
        a unique source address that indicates a source device of a data packet inside the at least one packetized data stream; and
        a program identification number that indicates a source program of a data packet inside the at least one packetized data stream;
    a de-multiplexer configured for de-multiplexing the incoming multiplexed signal into data packets associated with the at least one packetized data stream based on the unique source address associated with each data packet;
    a controller configured for determining if decryption is allowed for the data packets associated with the least one packetized data stream and for controlling decryption parameters; and
    a decryptor configured for decrypting, if decryption is allowed, the data packets associated with the at least one packetized data stream using decryption parameters for the ax least one packetized data stream.

11. The method of claim 10, wherein the data packets and the packetized data stream are in a format compliant with at least one of Moving Picture Experts type 2 (MPEQ-2) standard, Moving Picture Experts Group type 4 (MPEG-4) standard, Asynchronous Transfer Modulation (ATM) standard, and Internet Protocol (IP) standard.

12. The method of claim 10, further comprising an encryptor for encrypting the data packets associated with the at least one packetized data stream.

13. The method of claim 12, wherein the encryption provides copy protection for the data packets associated with the at least one packetized data stream.

14. A host terminal that provides a multiplexed signal to an external conditional access module, wherein the multiplexed signal includes data packets from at least two packetized data streams, the host terminal comprising:
at least two tuners, each tuner for receiving one of the at least two packetized data streams; and
a multiplexer for combining data packets from the at least two packetized data streams into the multiplexed signal, for assigning a unique source device address that indicates which tuner received the packetized data stream associated with the data packets, for assigning to the source program of at least one packetized data stream, a program identification number; for transmitting the multiplexed signal to the external conditional access module, and for communicating the unique source address associated with each data packet to the external conditional access module.

15. The host terminal of claim 14, wherein the data packets and the packetized data stream are in a format compliant with at least one of Moving Picture Experts Group type 2 (MPEG-2) standard, Moving Picture Experts Group type 4 (MPEG-4) standard, Asynchronous Transfer Modulation (ATM) standard, and Internet Protocol (IP) standard.

16. The host terminal of claim 14, further comprising a demultiplexer for receiving an output signal from the external conditional access module, for de-multiplexing the output signal, and for providing the at least two packetized data streams as separate packetized data streams.

17. The method of claim 3, wherein the at least one packetized data steam comprises a first encrypted signal, and wherein the source device of the at least one packetized data steam comprises a first tuner.

18. The method of claim 3, further comprising decrypting the first encrypted signal subject to a first authorization.

19. A point-of-deployment (POD) module comprising:
a host terminal interface configured to receive from a host terminal, a multiplexed signal comprising a first encrypted signal together with a first transport stream source indicator signal (TSSIS) and a program identification number;
a demultiplexer configured to use the first TSSIS to identify the first encrypted signal in the multiplexed signal;
a controller configured to generate a first decryption instruction upon receiving authorization through a first authorization grant signal; and
a first decryptor configured to receive from the demultiplexer, the first encrypted signal, and decrypt the first encrypted signal conditional to receiving the first decryption instruction;
wherein the first TSSIS indicates the source device for the first transport steam.

20. The POD module of claim 19, further comprising:
the host terminal interface configured to receive from the host terminal, the multiplexed signal comprising a second encrypted signal together with a second transport stream source indicator signal (TSSIS);
the demultiplexer configured to use the second TSSIS to identify the second encrypted signal in the multiplexed signal;
the controller configured to generate a second decryption instruction upon receiving authorization through a second authorization grant signal; and
a second decryptor configured to receive from the demultiplexer, the second encrypted signal, and decrypt the second encrypted signal conditional to receiving the second decryption instruction.

21. The method of claim 17, further comprising:
assigning to a second tuner that is a source of the second packetized data stream, a second unique designator, and transmitting the second unique designator in conjunction with the multiplexed signal, whereby the second unique designator provides an identification of the second tuner as the source of the second packetized data stream.

* * * * *